US006097388A

United States Patent [19]

[11] Patent Number: 6,097,388
[45] Date of Patent: *Aug. 1, 2000

Goodfellow

[54] METHOD FOR MANAGING NON-RECTANGULAR WINDOWS IN A RASTER DISPLAY

[75] Inventor: Michael J. Goodfellow, Foster City, Calif.

[73] Assignee: International Business Machines Corporation, Armonk, N.Y.

[ * ] Notice: This patent is subject to a terminal disclaimer.

[21] Appl. No.: 08/729,976

[22] Filed: Oct. 15, 1996

Related U.S. Application Data

[63] Continuation of application No. 08/518,085, Aug. 22, 1995, Pat. No. 5,596,345.

[51] Int. Cl.[7] .............. G06F 13/00
[52] U.S. Cl. .............. 345/344; 345/113; 345/342
[58] Field of Search .............. 345/112, 113, 345/114, 118, 340, 341, 342, 343, 344, 345, 121, 339, 202

[56] References Cited

U.S. PATENT DOCUMENTS

| | | | |
|---|---|---|---|
| 4,414,628 | 11/1983 | Ahuja et al. | 364/200 |
| 4,460,958 | 7/1984 | Christopher | 364/200 |
| 4,555,775 | 11/1985 | Pike | 364/900 |
| 4,559,533 | 12/1985 | Bass et al. | 340/724 |
| 4,574,364 | 3/1986 | Tabata et al. | 364/900 |
| 4,586,035 | 4/1986 | Baker et al. | 340/706 |
| 4,598,384 | 7/1986 | Shaw et al. | 364/900 |
| 4,648,119 | 3/1987 | Wingfield et al. | 382/27 |
| 4,653,020 | 3/1987 | Cheselka | 364/900 |
| 4,710,767 | 12/1987 | Sciacero et al. | 340/799 |
| 4,754,433 | 6/1988 | Lyke | 340/403 |
| 4,755,809 | 7/1988 | Ikegami et al. | 340/724 |
| 4,780,709 | 10/1988 | Randall | 349/721 |
| 4,780,710 | 10/1988 | Tatsumi | 340/721 |
| 4,806,919 | 2/1989 | Nakayama | 340/721 |

(List continued on next page.)

FOREIGN PATENT DOCUMENTS

| | | | |
|---|---|---|---|
| 368117 | 5/1990 | European Pat. Off. | 340/784 |
| 542143 | 12/1993 | European Pat. Off. | 345/97 |
| 1292424 | 11/1989 | Japan | G06F 3/14 |
| 5053537 | 3/1993 | Japan | 345/97 |

OTHER PUBLICATIONS

T. Alexander et al., "Windows for Workstations: A Menu for Multitasking".

T. Anthias et al., "Emulating Overlapping Windows on an Alphanumeric Display", IBM Technical Disclosure Bulletin, vol. 30, No. 5, Oct. 1987, pp. 210–211.

(List continued on next page.)

*Primary Examiner*—Dennis-Doon Chow
*Attorney, Agent, or Firm*—Gray Cary Ware Freidenrich

[57] ABSTRACT

A method is provided for managing windows in a raster display. The method includes generating a first display map defining sequential picture element runs, each run having a common set of windows containing the picture elements of the run. The windows are arranged in a stacking order and include a topmost window which is drawn in the raster display, the other windows being covered by the topmost window. A window operation occurs when a window is added, deleted or moved, and when the window stacking order is changed. In response to a window operation, there is generating a second display map defining sequential picture element runs, each run having a common set of windows containing the picture elements of the run. The windows are arranged in a stacking order and including a topmost window which is drawn in the raster display, the other windows being covered by the topmost window. In order to refresh the raster display, the first display map is compared with the second display map to identify picture elements whose topmost window has changed. The raster display is repainted by writing the changed picture elements with data from the topmost window of the identified picture elements.

20 Claims, 13 Drawing Sheets

U.S. PATENT DOCUMENTS

| | | | |
|---|---|---|---|
| 5,036,315 | 7/1991 | Gurley | 345/121 |
| 5,047,755 | 9/1991 | Marita et al. | 345/120 |
| 5,061,119 | 10/1991 | Watkins | 346/121 |
| 5,241,656 | 8/1993 | Loucks et al. | 393/158 |
| 5,515,494 | 5/1996 | Lentz | 345/334 |
| 5,600,346 | 2/1997 | Kamata et al. | 345/340 |

OTHER PUBLICATIONS

Rob Pike, "Graphics in Overlapping Bitmap Layers", Bell Laboratories, Computer Graphics, vol. 17, No. 3, Jul. 1983 pp. 331–356.

D.M. Gaumgartner et al., "Using Windows for Icons", IBM Technical Disclosure Bulletin, vol. 27, No. 9, Feb. 1985, p. 5176.

36

| COVER COLLECTION | | | | | |
|---|---|---|---|---|---|
| COVER INDEX | BITMAP | | | REFCOUNT | TOPMOST |
| | $W_A$ | $W_B$ | $W_C$ | | |
| 0 | 0 | 0 | 0 | 37 | null |
| 1 | 1 | 0 | 0 | 17 | $W_A$ |
| 2 | 0 | 1 | 0 | 16 | $W_B$ |
| 3 | 1 | 1 | 0 | 5 | $W_A$ |
| 4 | 1 | 1 | 1 | 1 | $W_A$ |
| 5 | 0 | 1 | 1 | 3 | $W_B$ |
| 6 | 0 | 0 | 1 | 19 | $W_C$ |
| 7 | 1 | 0 | 1 | 2 | $W_A$ |

*FIG. 6*

38

| DISPLAY MAP | | |
|---|---|---|
| SCANLINE | SCANLEN | RUNS |
| 0 | 1 | $A_0$ |
| 1 | 3 | $A_1$ |
| 2 | 3 | $A_4$ |
| 3 | 4 | $A_7$ |
| 4 | 4 | $A_{11}$ |
| 5 | 6 | $A_{15}$ |
| 6 | 4 | $A_{21}$ |
| 7 | 4 | $A_{25}$ |
| 8 | 3 | $A_{29}$ |
| 9 | 3 | $A_{32}$ |

44

46

44

| DISPLAY MAP STORAGE | | |
|---|---|---|
| ADDRESS | COUNT | COVER INDEX |
| $A_0$ | 10 | 0 |
| $A_1$ | 3 | 0 |
| $A_2$ | 5 | 2 |
| $A_3$ | 2 | 0 |
| $A_4$ | 3 | 0 |
| $A_5$ | 5 | 2 |
| $A_6$ | 2 | 0 |
| $A_7$ | 3 | 1 |
| $A_8$ | 2 | 3 |
| $A_9$ | 3 | 2 |
| $A_{10}$ | 2 | 0 |
| $A_{11}$ | 3 | 1 |
| $A_{12}$ | 2 | 3 |
| $A_{13}$ | 3 | 2 |
| $A_{14}$ | 2 | 0 |
| $A_{15}$ | 3 | 1 |
| $A_{16}$ | 1 | 3 |

46

| DISPLAY MAP STORAGE | | |
|---|---|---|
| ADDRESS | COUNT | COVER INDEX |
| $A_{17}$ | 1 | 4 |
| $A_{18}$ | 3 | 5 |
| $A_{19}$ | 1 | 6 |
| $A_{20}$ | 1 | 0 |
| $A_{21}$ | 4 | 1 |
| $A_{22}$ | 1 | 7 |
| $A_{23}$ | 4 | 6 |
| $A_{24}$ | 1 | 0 |
| $A_{25}$ | 4 | 1 |
| $A_{26}$ | 1 | 7 |
| $A_{27}$ | 4 | 6 |
| $A_{28}$ | 1 | 0 |
| $A_{29}$ | 4 | 0 |
| $A_{30}$ | 5 | 6 |
| $A_{31}$ | 1 | 0 |
| $A_{32}$ | 4 | 0 |
| $A_{33}$ | 5 | 6 |
| $A_{34}$ | 1 | 0 |

*FIG. 7*

METHOD FOR MANAGING NON-RECTANGULAR WINDOWS IN A RASTER DISPLAY

CROSS REFERENCE TO RELATED APPLICATION

This application is a continuation of application Ser. No. 08/518,085, filed Aug. 22, 1995, now U.S. Pat. No. 5,596,345.

BACKGROUND OF THE INVENTION

The present invention relates to the management of information in a raster display, and more particularly, to the management of information in regions of a display called windows.

A raster display is represented as a rectangle of picture elements or pixels of some fixed size, for example, 1024 by 1024. Within this display area, it is desirable to manage a set of windows. A window is a pattern of text and/or graphics information clipped to a particular region of the display. A region is any arbitrary subset of display pixels. Windows are used extensively in data processing systems for presenting information to a user and for providing graphical user interfacing wherein commands and data can be input via graphical controls and data entry fields. These windows provide standardized rectangular display areas for information input and output. Not all windows, however, are rectangular. There are other window display configurations that provide non-standardized or customized windows, for graphics and other purposes, which may include a variety of shapes, sizes and information content.

It is conventional for display windows to have a stacking order wherein windows at the top obscure other windows below in the stacking order. Windows are thus arranged like sheets of paper on a desk top wherein only the topmost sheet is entirely visible and wherein some sheets may not be visible at all. Like sheets of paper, windows are periodically added, deleted or repositioned in the display. This requires a sequence of data processing steps which shall be referred to as a window operation. A window operation is performed when any of the following tasks is requested:

1. Create a new window on a region of the display.
2. Destroy a window.
3. Change the region on which a window is defined.
4. Change the stacking order of windows.

The result of any one of these operations is a list of display updates representing a reorganization of display information. Each update writes a region of the display with the revealed portions of some window, or with the background.

A typical window operation is illustrated in FIGS. 1 and 2. Three circular windows A, B and C are stacked in that order. If window B is moved upwards, the region labelled 1 must be redrawn with the contents of window B and the region labelled 2 must be redrawn with the contents of window C. The standard approach used to handle this problem is to first compute a rectangle that encloses all of the area that is changed. For example, when deleting a window, the rectangle encloses the window. When moving a window, the rectangle encloses both the old and new window positions. Once defined, the rectangle is cleared to the background color. Next, all windows that intersect the rectangle are redrawn, The redraws must be clipped to the rectangle, so that only pixels within the rectangle are redrawn. The windows must be redrawn in reverse order, from bottommost to topmost. Windows that do not intersect the rectangle are not redrawn.

Although the foregoing procedure is used in many commercial drawing editors, it has several disadvantages. First, the method can be slow if many windows need to be redrawn. Second, the damaged area is redrawn many times, producing a flickering of the area that is annoying to users. Third, inefficiencies result when non-rectangular windows are displayed due to the unnecessary repainting of pixels outside the treated window(s) but inside the computed rectangle. Accordingly, there is an evident need for a window management method that allows many changes to be made to non-rectangular (and rectangular) windows between updates of the display, but wherein a minimum number of pixels are redrawn when an update is called for. In this manner, processing time could be decreased and display flicker could be avoided.

SUMMARY OF THE INVENTION

The present invention is directed to a method for managing windows in a raster display. The method includes generating a first display map of values identifying sequential picture element runs in the raster display constituting a first display image. Each identified picture element run has a common set of windows containing the picture elements of the run. The windows are arranged in a stacking order and include a topmost window which is drawn in the raster display, the other windows being covered by the topmost window. A window operation occurs when a window is added, deleted or moved, and when the window stacking order is changed. In response to a window operation, there is generated a second display map of values identifying sequential picture element runs in the raster display constituting a second display image. Each identified picture element run has a common set of windows containing the picture elements of the run. The windows are arranged in a stacking order and include a topmost window which is drawn in the raster display, the other windows being covered by the topmost window. In order to refresh the raster display, the first display map is compared with the second display map to identify picture elements whose topmost window has changed. The raster display is repainted by writing the changed picture elements with data from the topmost window of the identified picture elements.

BRIEF DESCRIPTION OF THE DRAWINGS

FIG. 6 is a detailed diagrammatic representation of a cover collection data structure implemented by the window management system of FIG. 3;

FIG. 7 is a detailed diagrammatic representation of a display map data structure implemented by the window management system of FIG. 3;

DETAILED DESCRIPTION OF THE PREFERRED EMBODIMENT

OVERVIEW OF WINDOW MANAGEMENT SYSTEM

Figure 1:
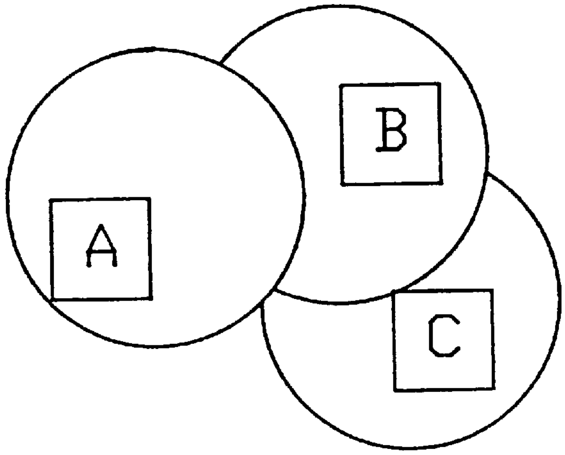
FIG. 1 (PRIOR ART)
FIG. 1 is a diagrammatic view of windows arranged in conventional fashion prior to a window operation.
Figure 2:
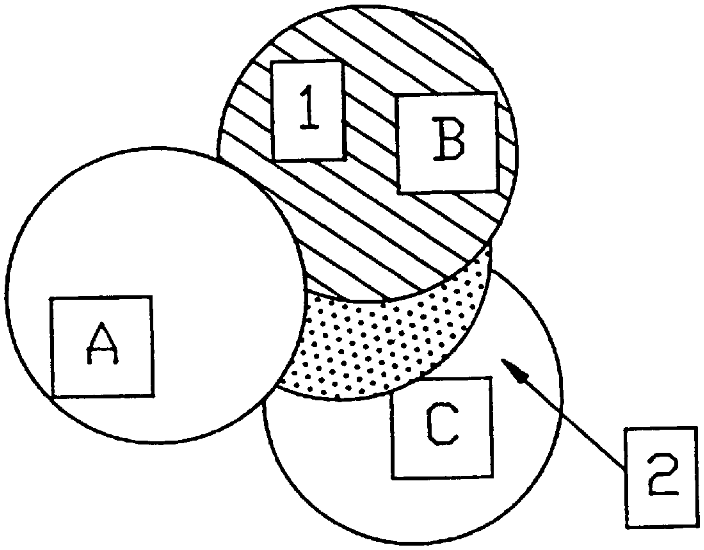
FIG. 2 (PRIOR ART)
FIG. 2 is a diagrammatic view of the windows of FIG. 1 shown in a rearranged position following a window operation.
Figure 3:
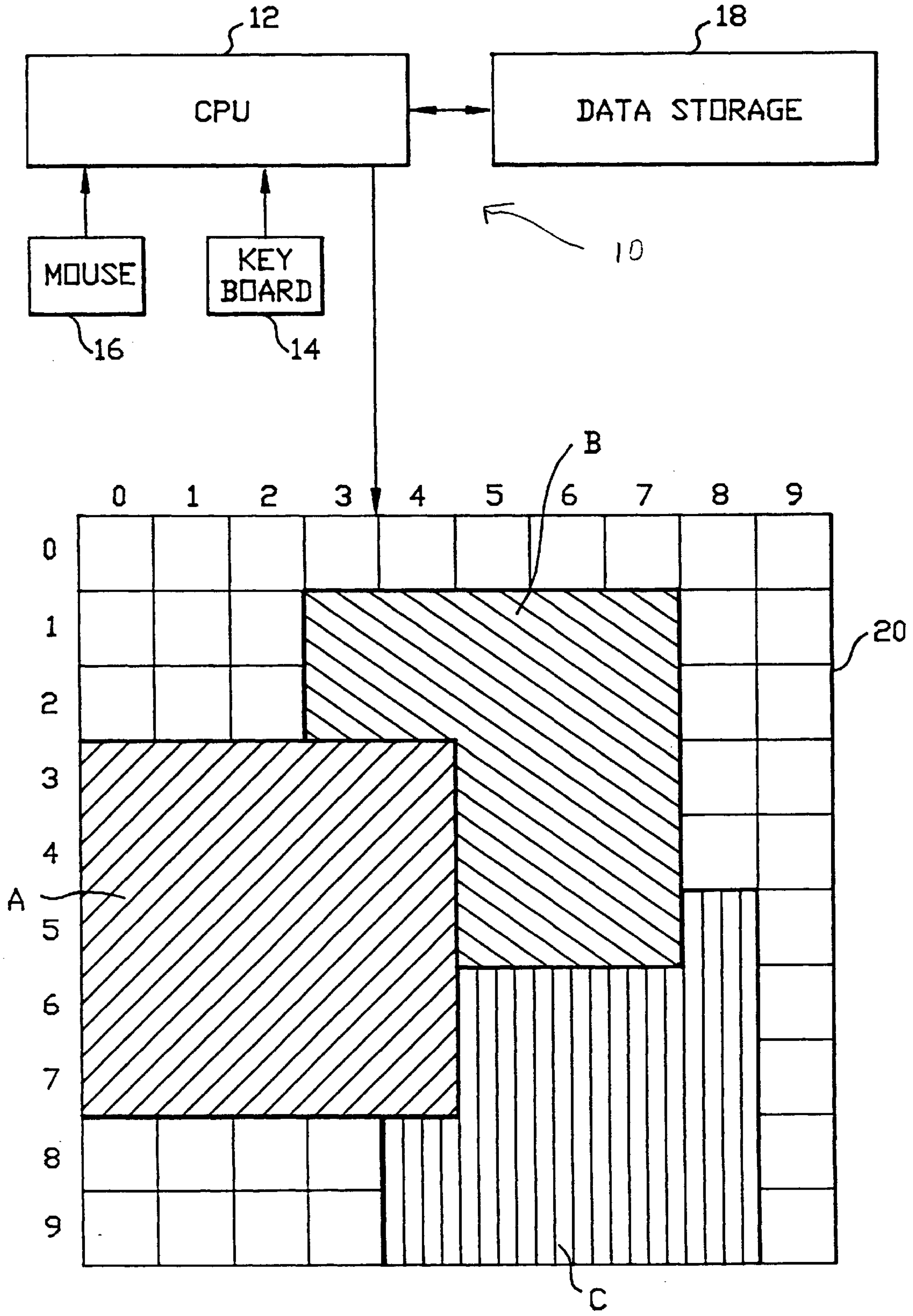
FIG. 3 is a partial block diagrammatic representation of a window management system constructed in accordance with the present invention.

Referring now to FIG. 3, the window management system of the present invention may be embodied in a data processing apparatus 10 of conventional design, including a stand-alone or networked personal computer (PC), a work station or a terminal configured for operation with a mid-range or mainframe computer system. The data processing apparatus 10 generally includes a CPU 12, an input system having a keyboard device 14 and, optionally, a mouse 16, a data storage device 18 and an output system including a raster display device 20. The data storage device 18 contains programs for controlling the data processing apparatus 10 to generate images in the raster display device 20. As is conventional, the raster display generates images formed by a plurality of illuminated picture elements or pixels arranged in a series of horizontal scan lines, as shown in FIG. 1.

The data storage device 18 stores programming resources for defining windows to be displayed in the raster display 20. These resources are collectively illustrated in FIG. 4 by reference number 30. Window information may be stored in a variety of ways according to conventional techniques. For example, windows can be stored as pixel arrays wherein sequential memory locations store information for driving individual picture elements of the display. Display updates are produced by reading the stored pixel array information. In other cases, windows may comprise solid colors, for example, if the windows are used to manage graphics. These windows can be stored by identifying a range of pixel values and corresponding color and other display information. In other cases, windows are defined by programming code which is executed when a repaint operation occurs.

Windows are defined on regions of the display. Although windows can also be defined to include areas not on the display, only displayed window portions require management. As shown in FIG. 3, the top-left pixel of the display 20 is labelled (0,0) with x running from left to right, and y running from top to bottom. FIG. 3 illustrates, for ease of discussion, a display having ten scanlines of ten pixels each. As indicated, conventional displays may provide an array of 1024 by 1024 pixels. Three windows A, B, and C are shown in overlapping relation in the indicated stacking order. Although the windows are rectangular in shape, it will be understood that they may be circular or have many other shapes.

Figure 4:
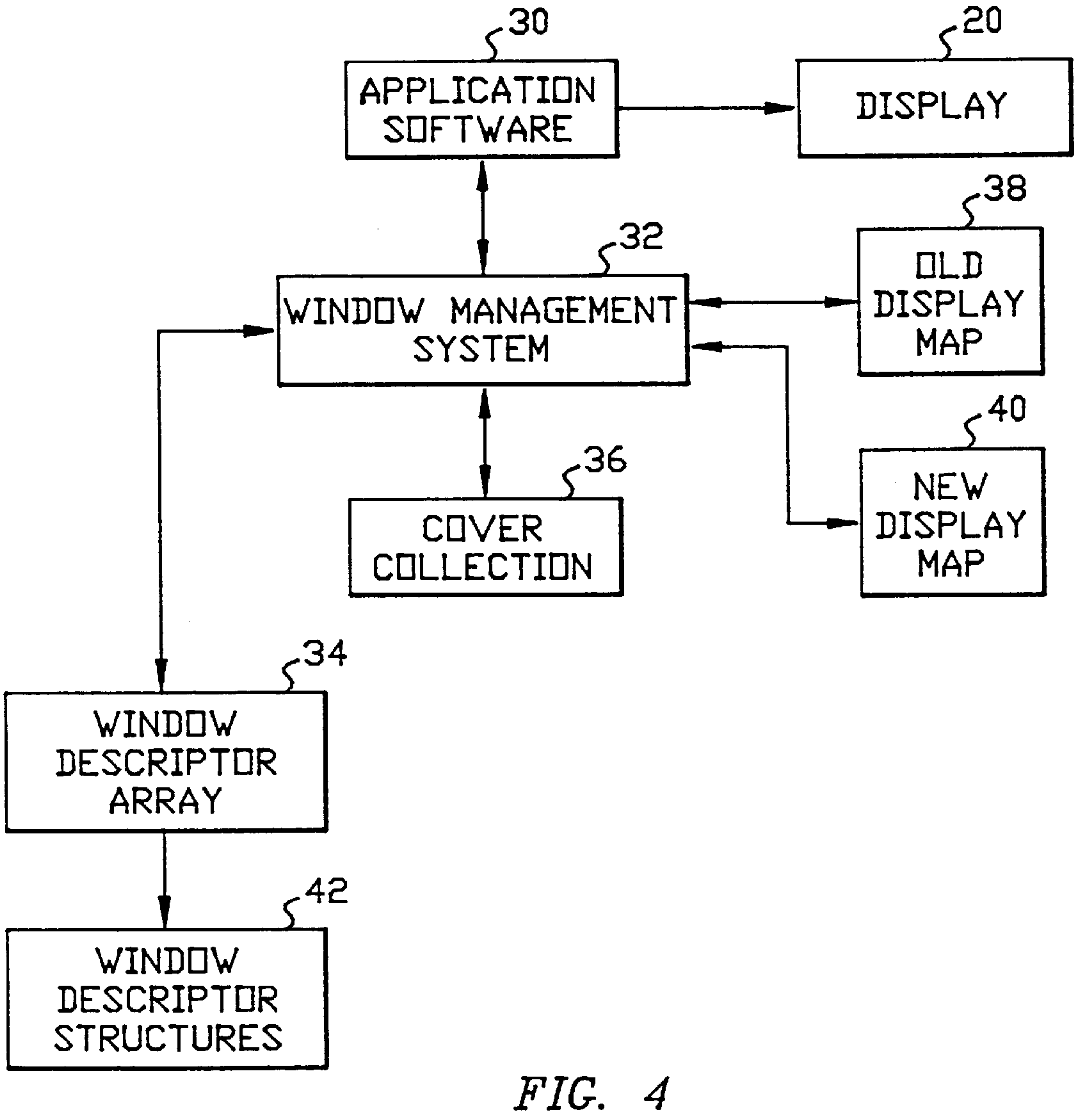
FIG. 4 is a detailed block diagram illustrating additional features of the window management system of FIG. 3.

Turning now to FIG. 4, the display 20 is shown in relation to the applications software resources 30 and a window management system 32 for controlling window operations. The window management system 32 must implement the following operations with reference to the display:

1. Create a new window on a region of the display.
2. Destroy a window.
3. Change the region on which a window is defined.
4. Change the stacking order of windows.

Operations 3 and 4 are derived in terms of 1 and 2. To change the region of a window, it is destroyed and recreated with the new region. Similarly, to restack a window, it is destroyed and then a new window is created at the new position in the stacking order. Any number of window manipulation operations can be performed, and then a display update can be requested. At update time, the modified portions of the display will be redrawn.

The window management system 32 creates and implements three principal data structure types: a window descriptor array 34, a cover collection 36, and old and new display maps 38 and 40, respectively. The window descriptor array 34 is a list of pointers to a collection of window descriptor structures 42, which are also created by the window management system 32. Each window descriptor structure identifies a corresponding display window and contains information about the position of the window in the window stacking order.

The cover collection 36 is used to identify picture element runs sharing common windows. Each window contains some subset of pixels on the display. For each pixel, there is also some subset of windows which contain that pixel. Since the order of windows is known from the window descriptor structures 42, each pixel can be characterized by a string of bits, one bit for each window containing the pixel. If the bit is on, the window includes the pixel. If off, the window does not include the pixel. This bit string is called the "cover" of the pixel. In general, the cover will not be unique to a pixel. Many pixels will be contained by the same set of windows and will share the same cover. The cover collection 36 is the set of all distinct covers still in use in the display maps.

The display maps 38 and 40 are arrays of values identifying run-length encodings of pixels on the display. These run-length representations are used to determine which pixels are included in a window region. For each row (scanline of the display which intersects the window region, the following is recorded:

The y-value of the scanline.

The number of pixel runs in the scanline.

The run-length encoding of the scanline.

The run-length encoding is an array of lengths. The first length is the number of pixels from the left edge of the scanline that are within the region (this may be zero). The next run-length is the number of pixels after this group which are not in the region. Subsequent runs alternately describe the number of pixels in the region and the number of pixels out of the region. The total length of all the runs must equal the display width. Each run of pixels shares the same cover. In other words, all of the pixels in a run are included in the same set of windows. Two display maps are kept. When a group of window operations is started, a current display map is saved as an "old" display map 38. As operations progress, a "new" display map 40 is generated. At update time, the old and new display maps are compared to produce the redraws of the display.

The foregoing data structures allow a complex overlapping of windows on the display to be represented and manipulated simply. The time required to update a portion of the display with a new window is primarily a function of the size of the window and the number of the other windows it covers. The total number of windows has only an indirect effect on the time to change the display.

THE WINDOW DESCRIPTOR ARRAY

Figure 5:
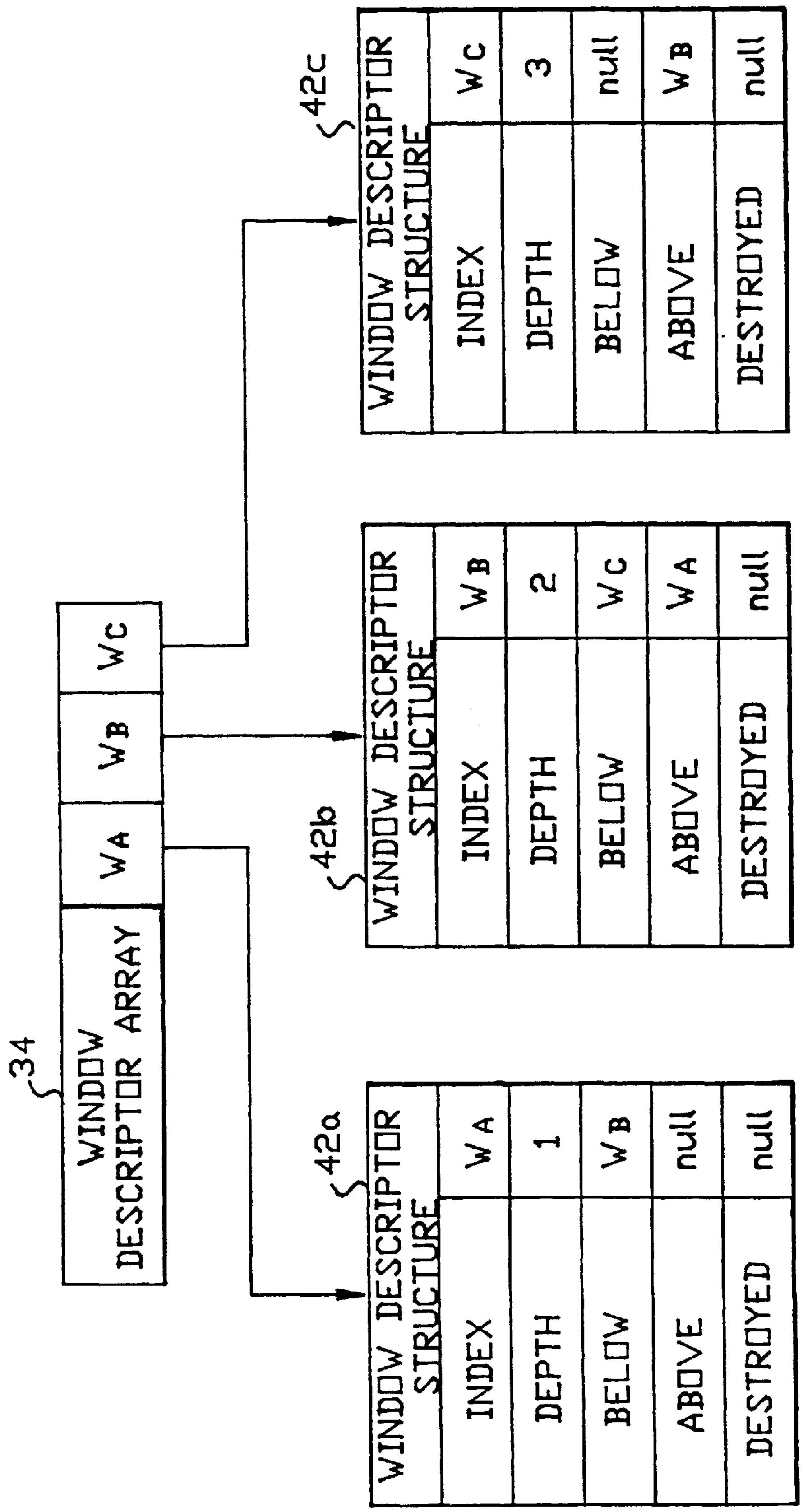
FIG. 5 is a detailed diagrammatic representation of a window descriptor data structure implemented by the window management system of FIG. 3.
Figure 8A:
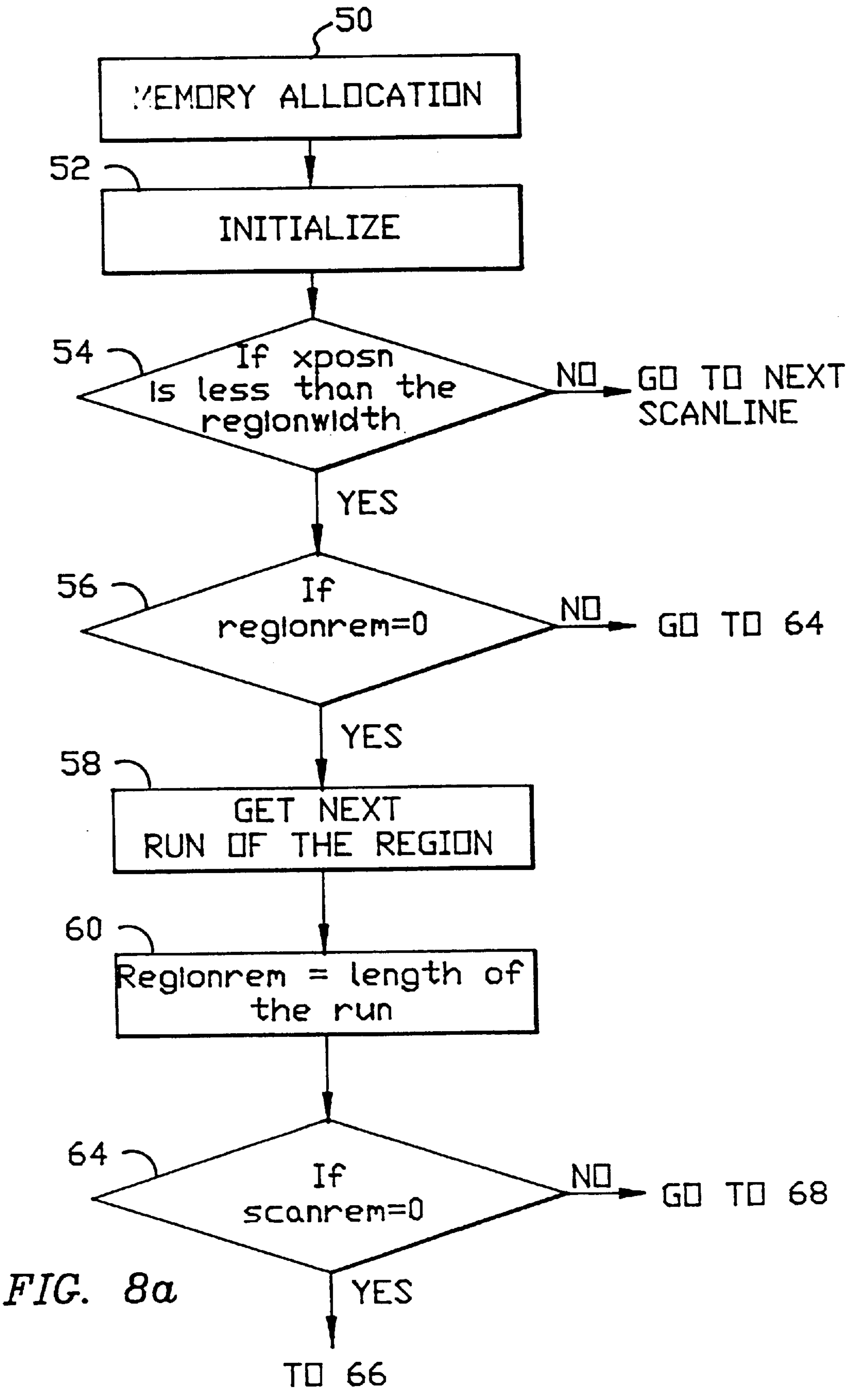
FIGS. 8*a*–8*d* set forth a flow diagram of a display map modification procedure implemented by the window management system of FIG. 3.
Figure 8B:
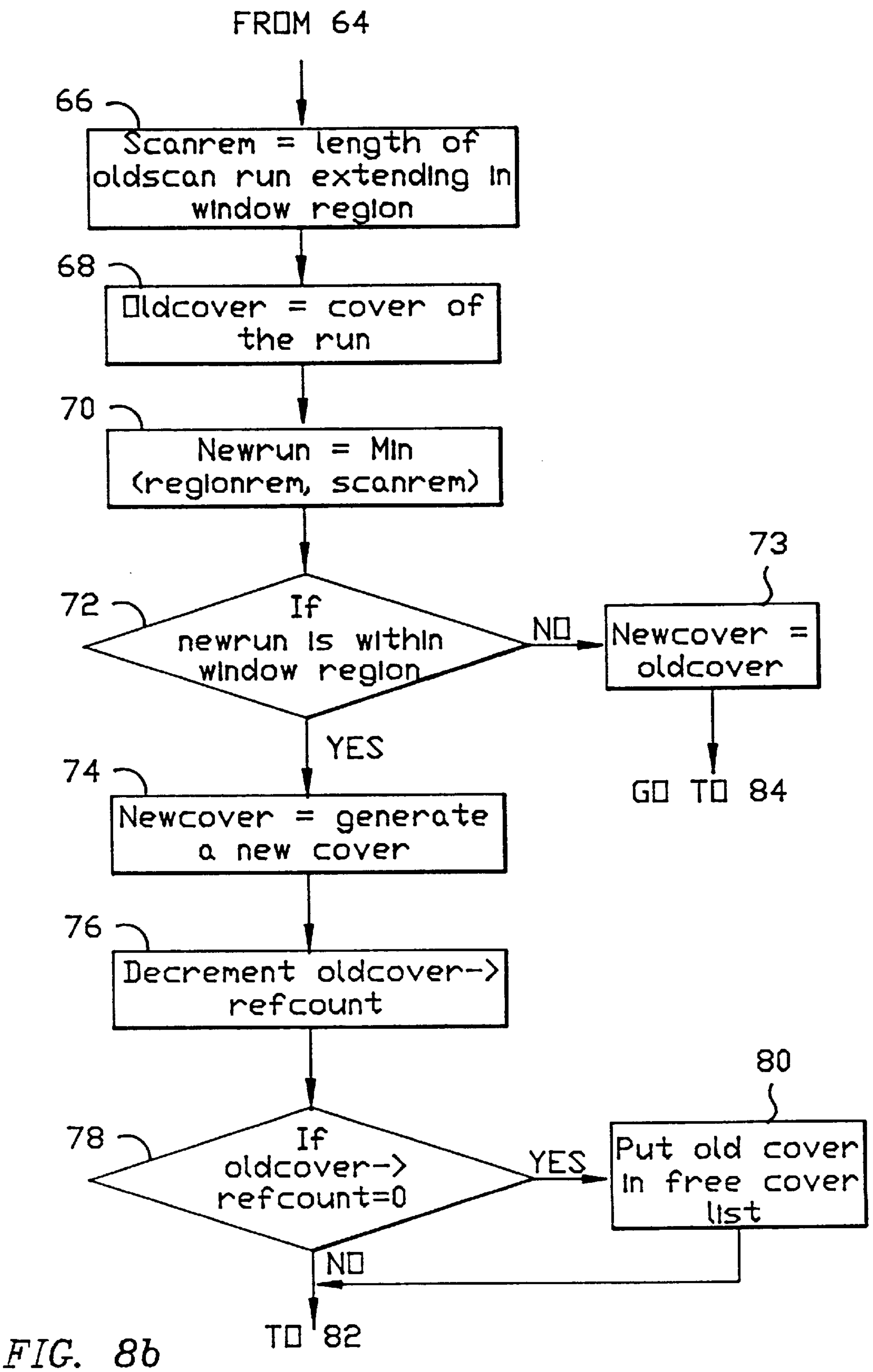
Figure 8C:
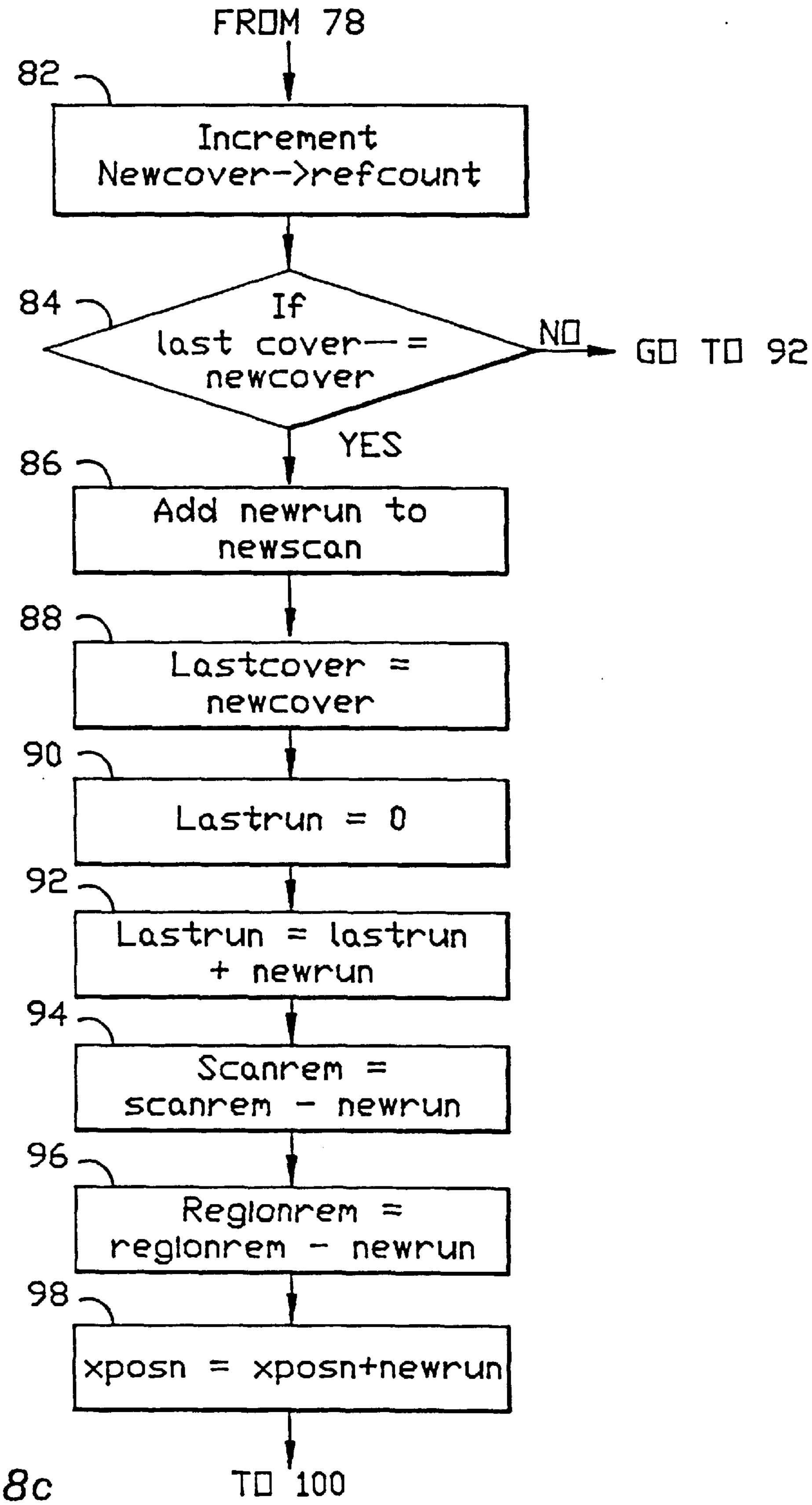
Figure 8D:
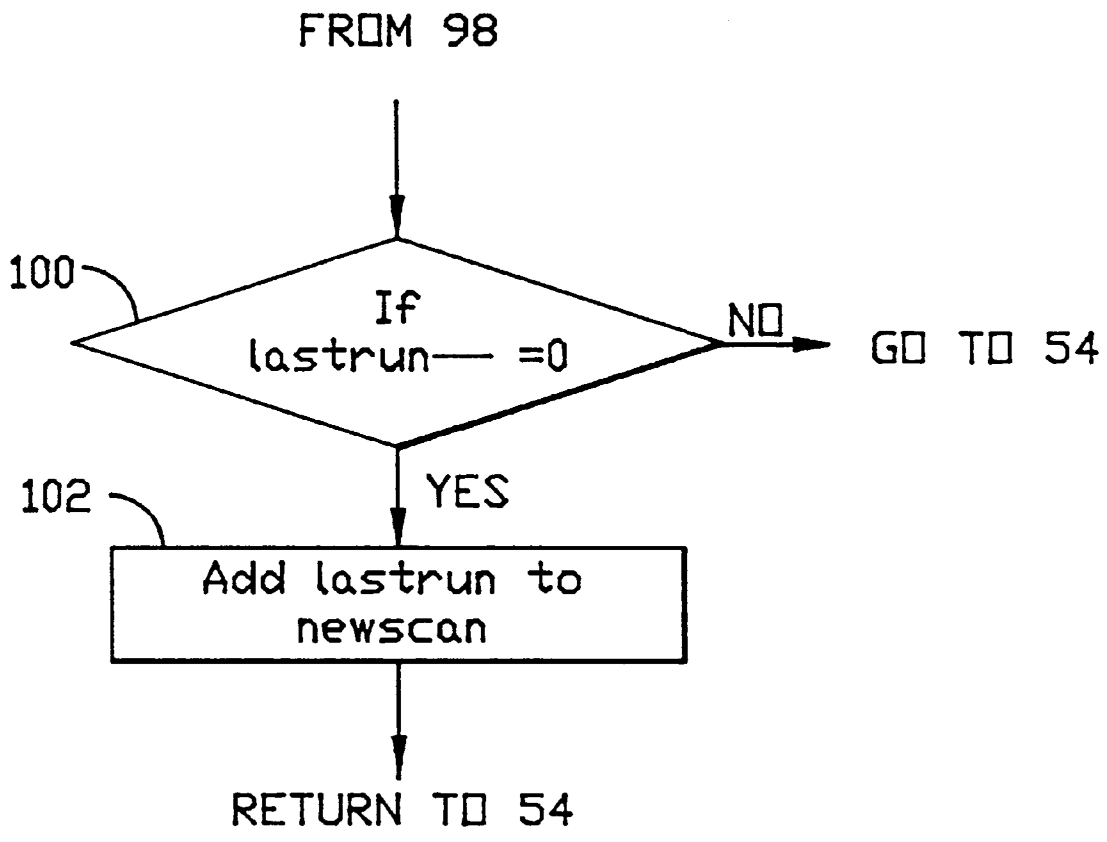

As indicated above, each window in the display is identified by the window management system 32 in a window descriptor structure 42. The window descriptor array 34 provides a list of "maxwindows" (the maximum number of window that can be handled) pointers to the windows descriptor structures. FIG. 5 illustrates three window descriptor structures 42*a*, 42*b* and 42*c*, corresponding to the windows A, B and C illustrated in FIG. 3. The window descriptor array 34 contains pointers $W_A$, $W_B$ and $W_C$ to these structures. Each window descriptor 42*a*, 42*b* and 42*c* contains the following information for the windows A, B and C:

index The position in the window descriptor array which points to the window descriptor structure.

depth An integer provided by the applications software indicating the position of the window in the stacking order. If the depth of window A is less than the depth of window B, then window A is above window B in the stacking order.

below A pointer to the window below this window in the window stacking order.

above A pointer to the window above this window in the window stacking order.

destroyed A flag indicating that the window has been destroyed.

The window descriptor structures thus specify the stacking order of the windows A, B and C. In addition, the windows are arranged in a doubly-linked list using the "above" and "below" pointers. The top window A is further recorded in a variable "topwindow" (not shown), and the bottom window C is recorded in a variable "bottomwindow" (not shown).

THE COVER COLLECTION

As indicated above, the cover collection 36 is a list of window "covers". An entry in the cover collection 36 thus describes a set of windows that overlap on the display. FIG. 6 illustrates a cover collection containing covers representing the arrangement of windows A, B and C in the display 20, as shown in FIG. 3. Each cover entry contains the following information:

cover_index The position of the cover entry in the cover collection.

bitmap An array of "maxwindow" bits, each corresponding to a position in the "windows" array. If the bit is on, the corresponding window is in the cover.

refcount The number of display pixels which have this cover.

topmost The "index" (position in the "windows" array) of the topmost (lowest depth) window present in the cover bitmap.

In the display 20 of FIG. 3, it can be seen that there are a total of eight distinct covers. The first cover, represented by cover index zero in the cover collection 36, is the null or background cover having no window bits set in the cover collection bitmap. Initially, the cover collection includes only the null cover encompassing all of the display pixels. The cover collection is enlarged as windows are added to the display. In the cover representation of the display 20, the background cover encompasses thirty-seven pixels as indicated by the value "refcount" for cover index zero. Cover 1 applies to all pixels containing window A only. The refcount value for that cover is seventeen and topmost is $W_A$. Cover 2 applies to all pixels containing window B only. The refcount for that cover is six and topmost is $W_B$. Cover 3 applies to all pixels containing windows A and B only. The refcount for that cover is five and topmost is $W_A$. Cover 4 applies to all pixels containing windows A, B and C only. The refcount for that cover is one and topmost is $W_A$. Cover 5 applies to all pixels containing windows B and C only. The refcount for that cover is three and topmost is $W_B$. Cover 6 applies to pixels containing window C only. The refcount is nineteen and topmost is $W_C$. Cover 7 applies to pixels containing windows A and C only. The refcount is two and topmost is $W_A$.

The set of covers currently active can be accessed in two ways:

By cover_index, when the cover of a particular run of pixels is needed.

By bitmap, when a new cover is generated by creating or deleting a window.

To handle access by cover_index, covers are kept in the cover collection 36 as an array. The array is allocated from heap storage and may be extended as necessary to hold all active covers. The cover_index is assigned when the cover is created, and is the position in the array of covers. To handle access by bitmap, a hash table (not shown) is created on the covers. The hash index is generated from the bitmap pattern. When covers are no longer in use, they are added to a list of free covers (not shown). The only valid field of the cover descriptor when free the is cover_index. When a new cover is needed, the free list is checked before extending the cover array.

THE DISPLAY MAP

As indicated above, the display maps 38 and 40 are arrays having plural storage positions with one entry per scanline of the display. FIG. 7 illustrates the display map 38 for the display 20 shown in FIG. 3, prior to a window operation being performed. Each entry of the display map is a run-length encoding of the covers that are used on the scanline. Each entry contains:

scanlen The number of runs in the scanline.

runs A pointer 44 to storage containing the runs.

Each run is stored in a display map storage area 46 as a pair of values:

count The number of pixels in the run.

cover_index The index of the cover shared by all pixels in the run. The cover of the run can be found by using this index to access the cover collection.

Thus, the display 20 of FIG. 3 encompasses ten scanlines and includes thirty-five pixel runs whose pixel count and corresponding cover are stored at memory address locations $A_0$ and $A_{34}$.

CREATING AND DELETING A WINDOW

As previously described, all window operations can be performed by adding and deleting windows. In complex operations, window addition and deletion may be performed multiple times before the display is refreshed. However, only those pixels which need to be changed to produce the final display are actually repainted. When a window is created or deleted by the applications software 30, values representing the stacking position of the window and the display area occupied by the window are obtained by the window management system 32. In a window create operation, the window management system 32 creates a new window descriptor structure 42 and inserts the window into a linked list of windows by setting the "above" and "below" pointers of the window descriptor structure and of the neighboring above and below window descriptor structures.

The "index" entry of the window descriptor structure is assigned by scanning the window descriptor array 34 for the first null pointer. This array position is provided with a pointer to the new window descriptor structure 42. Then the window descriptor structure "index" value is set to point to that position in the window descriptor array. The window descriptor structure "depth" value is assigned by averaging the depth of the window above (or 0 if this is the topmost window) and the window below (or the maximum integer if this is the bottommost window). If the depths of the windows above and below differ by only 1, all the windows are given new depths by assigning depths from the topmost window to the "depth" value of the associated window descriptor structures.

A converse operation is performed when a window is destroyed, except the window descriptor structure is not freed immediately. Instead, the "destroyed" flag is set. When the next display occurs, the window descriptor structure is freed, the "index" value thereof is reset to NULL and the window descriptor array is modified to eliminate the pointer to the deleted window descriptor structure.

MODIFYING A SCANLINE

As window operations are performed by the applications software 30, the window management system 32 modifies the scanlines of the display map 38 (as a new display map 40) to reflect window additions and deletions. Each scanline from the lowest to the highest included in a selected region of the display is replaced with a new version. To create the new version, the pixel runs that intersect the region of the window are modified to reflect changes in cover index and in the number of pixels in each run. Each window addition or deletion causes a new display map to be generated. The first new display map 40 is generated by modifying the old display map 38. Thereafter, subsequent new display maps are generated by modifying the previous new display map. Significantly, only the old display map and the final new display map need to be saved. They alone are used to refresh the display as will be described below.

FIGS. 8*a*–8*d* illustrate the logical flow of the display map modification procedure. The procedure is also shown in pseudo code form in Appendix A hereto. This procedure will be described with reference to FIGS. 3 and 9, which illustrate, respectively, the display 20 before and after a window operation wherein the window is moved upwardly and to the right of its initial position shown in FIG. 3. This window operation is performed in two subsidiary operations. In a first operation, the window B is deleted from its initial position and in a second operation, the window B is added at its new position.

In the window deletion operation, the applications software 30 provides the initial area coordinates and stacking position of window B to the window management system 32. From FIG. 3, it will be seen that window B initially encompasses scanlines one through five and pixel columns three through seven. It is second in the window stacking order. In response to the deletion of window B at its initial position, and prior to modifying the display map, the window management system 32 sets the window "destroyed" flag in the window descriptor structure $\mathbf{42}_B$ to indicate that window B has been deleted. The window management system then creates a new display map using the display map modification procedure of FIGS. 8*a*–8*d*. In describing that procedure, the following abbreviations are used for items in the data structures:

region A selected region of operation wherein the window being created or deleted. In FIG. 3, the region covers the entire display 20.

oldscan The scanline which is being replaced.

oldcover The cover of the current run in oldscan.

newscan The new copy of the scanline being built.

newcover The cover of the new run in the newscan.

xposn The current x position as we work through the scanline.

regionrem The portion of a region run in the new display map remaining to be processed.

scanrem The portion of an oldscan run in the old display map remaining to be processed.

lastcover The cover used on the last run created in newscan.

lastrun The length of the last run created in newscan.

newrun The length of a new run created for newscan.

The first step of the scanline modification procedure is memory allocation step 50 wherein space for each new scanline ("newscan") of the display map 40 is allocated. Following memory allocation, the following variables are initialized in an initialization step 52:

xposn=0 regionrem=0 scanrem=0 lastcover=no cover lastrun=0

Figure 9:
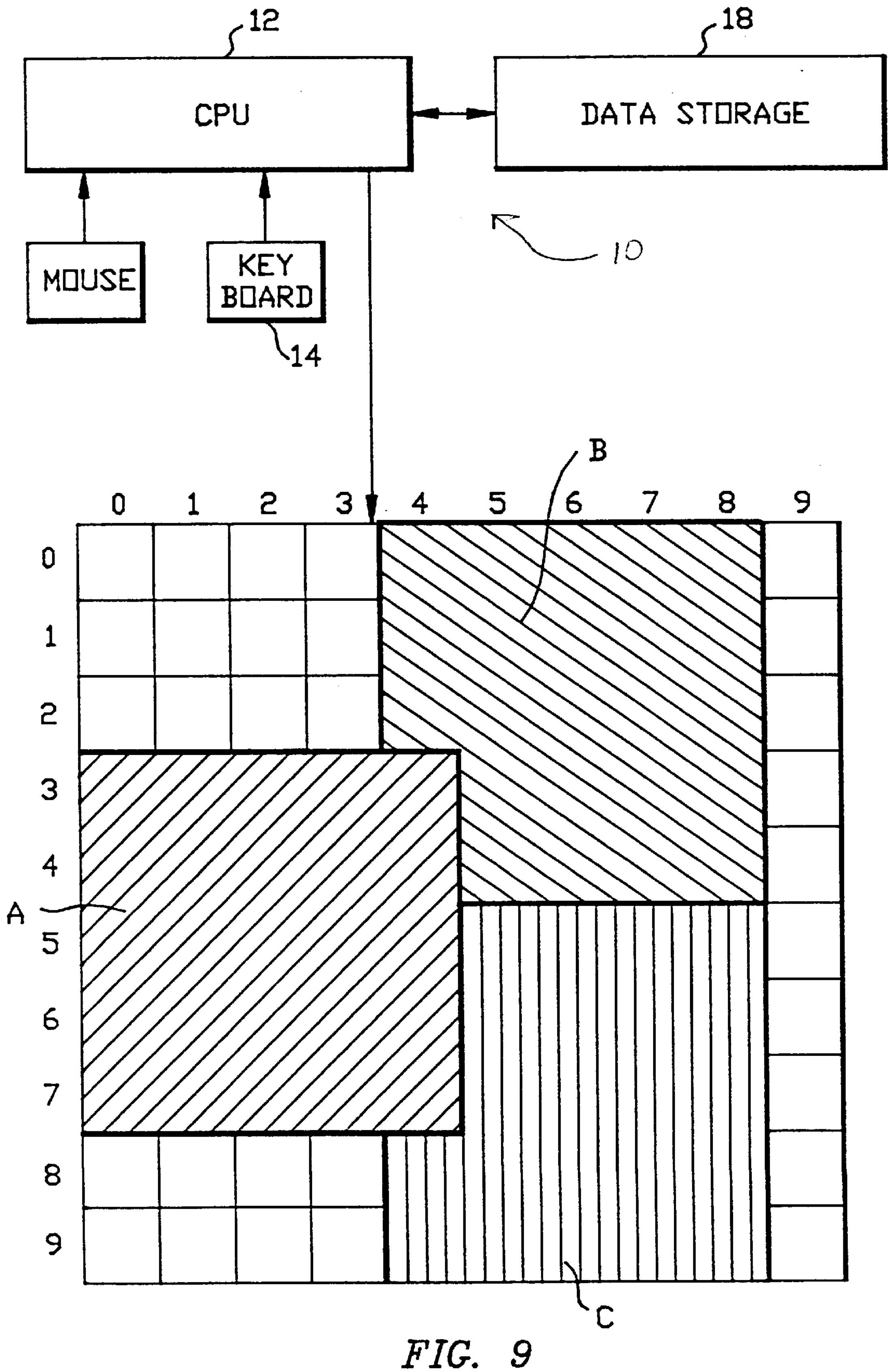
FIG. 9 is a partial diagrammatic representation of a modified display following a window operation.

Beginning at step 54, each run of the first scanline ("oldscan") in the old display map 38 is processed while xposn is less than the display width. In step 56, the processing of a run in in the new display map is monitored by testing the variable regionrem for equality to zero. If the value of regionrem is not zero, the process goes to step 64. If regionrem equals zero, which it does at the commencement of the procedure and following the construction of each new run in the new display map, the process moves to step 58 and the next run of the new display region is obtained. These runs are found using the runs from the old display region. Each run is copied unless the run crosses a window to be added. In that case, the old run is divided into two runs at each window edge it crosses. If a window is being deleted, the old runs can be used without changing the initial run length. IN FIG. 3, scanline 1, the first new run to be processed is the same length as the old run, which spans display columns zero through two. In FIG. 9, scanline 1, the first new run to be processed, following the addition of window B, would extend from display column one through column three, where the edge of added window B lies. Once the new run is obtained, its run length is used to reset regionrem in step 60. In step 64, the variable processing of a run in the old display map is monitored by testing the variable scanrem for equality with zero. If scanrem does not equal zero, the process proceeds to step 68. If scanrem equals zero, which it does at the commencement of the procedure, and following the processing of each run in the old display map, the process proceeds to step 65 and the next run of the old display map is obtained. These runs are found using the existing runs from the old display map. In FIG. 3, scanline 1,the first old run to be processed extends from display column zero through column two, where the edge of window B lies. In FIG. 9, scanline 1, the first old run to be processed extends over the entire width of the display. In process step 66, scanrem is reset with the length of obtained run. In step 68, the variable oldcover is assigned the cover index of the old scanline run. In FIG. 3, scanline 1, the cover of the oldscan run spanning display columns zero. through two (run Al in the cover collection of FIG. 7) is zero, indicating the run contains no windows. Likewise, in FIG. 3, scanline 1, the cover of the oldscan run spanning display columns zero through nine is zero, indicating again there are no windows in the run. The foregoing steps 54–68 are set forth in pseudocode form, as follows:

```
while (xposn < width) begin
  /* get the next run of region and oldscan,
  if necessary*/
  while (regionrem = 0) begin
    get the next run of the region.
    regionrem = length of the run
  end
  while (scanrem = 0) begin
    get the next run of oldscan
```

-continued

```
scanrem = length of the run
oldcover = cover of the run
end
```

The next step in the scanline modification process is to create a new picture element run over the intersection of the old and new region runs. This is done by comparing, in process step 70, the values regionrem and scanrem to determine which has the minimum pixel length. In FIG. 3, at the start of scanline 1, the old run length represented by scanrem equals three pixels. The new run length represented by regionrem also equals three pixels. The intersection, representing the newrun to be considered for addition to the new display map, has a run length of three pixels. IN FIG. 9, at the start of scanline 1, the old run length represented by scanrem equals ten pixels. The new run length represented by regionrem equals four pixels. The intersection, representing the newrun to be considered for addition to the new display map, has a run length of four pixels. Process step .70 is set forth below in pseudocode form:

```
/*find the intersection of the two runs*/
newrun = min(regionrem, scanrem)
```

With the value of newrun established, the process verifies in step 72 that newrun is within the pixel area of the added or deleted window. If not, the procedure advances to step 73 and newcover, the cover of newrun, is set equal to oldcover because its cover will not change as a result of the window operation. In FIG. 3, at the start of scanline 1, newrun spans the first three display columns and is thus outside the area of window B. Newrun in this case is assigned the oldcover value zero. Similarly, in FIG. 9, at the start of scanline 1, newrun spans the first four display columns and is also outside the area of window B. Thus, newrun in this case is also assigned the oldcover value zero. The procedure then jumps to process step 74. If newrun is within the window area, process step 74 is executed to generate a new cover index called "newcover" via a cover generation process described below. In FIG. 3, scanline 1, the second newrun of the new display region spans display columns three through seven. In FIG. 9, scanline 1, the second newrun of the new display region spans display columns fourth through eight. These newruns are within the window area and will thus receive new covers. Process steps 72 and 74 are illustrated in pseudocode form as follows:

```
if this run is within the region
   then begin
      newcover = generate a new cover (see below)
```

The next series steps of the scanline modification process are performed if a new cover is generated. In these steps, the variable "refcount" is adjusted, which represents the number of picture elements in the display associated with the old and new covers represented by the variables oldcover and newcover. In process step 76, the oldcover refcount is decremented by the number of pixels in the new picture element run "newrun". In process step 78, the refcount value of oldcover is tested for equality to zero. If it equals zero, the oldcover is placed in the free cover list in step 80. The process then proceeds to step 82 and the value of refcount for the new cover is incremented by the number of picture elements in newrun. Process steps 76–82 are represented in pseudocode form, as follows:

```
/*adjust the reference counts*/
oldcover−>refcount = oldcover−>refcount − newrun
if (oldcover−>refcount = 0)
   then put oldcover on the free cover list.
   newcover−>refcount = newcover−>refcount + newrun
end
```

The next series of steps of the scanline modification process seek to build new runs into the new display map. The new runs, however, are not immediately added to the new map. If this was done, scanlines would fragment into more and more runs as window operations progressed, until each run contained only one pixel. Instead, when a newrun is generated, it is compared to see if its cover is the same as the cover of the last run processed. If it is, the runs are combined. This keeps the scanlines to a minimum number of runs. If the covers are not the same, the previously processed run is added to the new display map. Thus, beginning in process step 84, the variable lastcover, which is initially set to zero, is tested for equality with newcover. If the covers are the same, the process proceeds to step 92. If lastcover does not equal newcover, the cover has changed and a previously processed run is added to the new copy of the scanline being built. This run has a pixel count of lastrun (initially zero) and a cover equal to lastcover. In process steps 88 and 90, the variable lastcover is assigned the value of newcover, and the variable lastrun is set to zero, respectively. Following process step 90, or if process step 84 yields a FALSE output (i.e., lastcover equals newcover), the variable lastrun is incremented with the length of newrun. This occurs in process step 92. In FIG. 3, the first newrun of scanline 1 (spanning display columns zero through two) is tested against an initial last cover value of zero. The cover values are found to be different and a new run is added to the new display map in process step 86. The new run, however, has a pixel count and cover equal to the initial value zero. In other words, the first new run is not yet added to the new display map. This does not occur until after the second newrun is processed and its cover tested for equality with the cover of the first newrun. Before that occurs, however, the process proceeds to step 92 and lastrun is incremented by the run length of the first newrun. A similar procedure is performed for the first newrun of scanline 1 of FIG. 9. The foregoing steps 84–90 are set forth in pseudocode form, as follows:

```
/*if the new cover is different, we must create a new
   run in newscan*/
if (lastcover¬ = newcover)
   then begin
      add new run to newscan, count is newrun, cover is
      newcover
      lastcover = newcover
      lastrun = 0
end
/*add the run to the accumulated run*/
   lastrun = lastrun + newrun
```

In process steps 94 and 96, the variables scanrem and regionrem are decremented by the value of newrun. In process step 98, the display position xposn is incremented by the value of newrun for processing the next picture element run. The procedure then returns to step 54 for processing the next run. Process steps 94–98 are set forth in pseudocode form, as follows:

```
/*subtract the run from the   two sources*/
   scanrem = scanrem − newrun
   regionrem = regionrem − newrun
/*advance our position on the scanline*/
   xposn = xposn + newrun
end
```

The remaining scanlines are processed in similar fashion. In FIG. 3, the second newrun of scanline 1 spans display columns three through seven. The newcover is zero because window B has been removed. In process step 84, it is found that this newcover equals the lastcover of the first newrun of scanline 1. The procedure jumps to process step 92 and lastrun is incremented with the run length of the second newrun. Lastrun thus now spans display columns zero through seven and lastcover is zero. A third pass through the procedure is made to process the third and final newrun of scanline 1 of FIG. 3. This newrun spans display columns eight through nine and has a newcover value of zero. In process step 84, it is found that this newcover equals lastcover. Thus, process step 92 is again executed and lastrun is incremented by the run length of the third newrun. Lastrun thus equals the entire display width. When the procedure returns for a fourth pass, xposn will be found equal the display width. At this point, the procedure will commence steps 100 and 102 to process the last run. In step 100, the value of lastrun is tested for equality with zero. If it is zero, processing of the next scanline is commenced. If lastrun is not equal to zero, step 102 is performed and lastrun is added to the new display map with the cover of lastcover. Process steps 100-102 are set forth in pseudo code form as follows:

```
/*output the last run*/
if (lastrun ¬  = 0)
   then add last run to newscan, count is lastrun, cover
   is last cover.
```

In the case of FIG. 3, scanline 1, a single run spanning the entire display width and having a cover value of zero is added to the new display map. In similar fashion, it will be seen that three new runs are added to a new display map for scanline 1 of FIG. 9. In a first pass through the procedure, the first newrun spanning display columns zero through three is defined but not added to the new display map. In a second pass through the procedure the second newrun spanning display columns four through eight is defined. Its cover is compared against the cover of the first newrun in process step 84. The covers will be found to be different and the first newrun will be added to the new display map in process step 86. In the third pass through the procedure, the third newrun spanning display column nine is defined. Its cover is compared against the cover of the second newrun in process step 84. The covers will be found to be different and the second newrun will be added to the new display map in process step 86. The third newrun is added to the new display map in process step 102.

In the foregoing procedure, as each run is generated, the "refcount" field of the covers involved is updated. The "newcover" run gains the pixels of the run, and "oldcover" run loses them. These "refcounts" are not just an optimization. The workability of the algorithm depends on keeping down the number of covers in the cover collection. If covers are not freed, unused covers would quickly accumulate as window operations are performed, and use up all available storage. The potential number of covers created is $_{2}$max-windows It is further noted that, for simplicity in describing the scanline modification procedure, the treated region spans the entire display width. However, this causes extra work. An alternative would be to process only those runs that intersect the pixel area of the added or deleted window. Scanline runs falling entirely outside the window region would be simply copied to the new display map. At the start of a scanline, the runs would be copied until the first run that intersects the region scanline is reached. Similarly, when the last run of the region is detected, the remaining runs of the scanline would be copied to "newscan". However, the first copied run after the window region is preferably checked to see if it has the same cover as the last run of the region, or else an unnecessary run may be created.

GENERATING A NEW COVER

In step 74 of the scanline modification process, the new cover of a run to be added to "newscan" must be created. The cover index of the old run is the input, as well as the window descriptor index of the window being created or deleted. The old cover is found by using the cover index of the old run to access the cover collection 36. From the bitmap of that cover, a new bitmap is generated by turning on the bit corresponding to the window index. Then a search for an existing cover with this bitmap is done by using the hash table access to the cover list. If the bitmap is found, "newcover" is assigned to the cover index of the identified bitmap. If the bitmap is not found, a new cover must be created.

To create a new cover, the list of free covers is first checked for a corresponding bitmap. If there is no corresponding bitmap found among free covers, a new slot in the cover collection 36 is allocated. The fields of the new cover are set as follows:

- cover_index is the position located in the cover list array.
- bitmap is the new bitmap, generated by modifying the old bitmap.
- refcount is initially zero; it will be reset in process step 82.
- topmost is set by comparing the depth of the window being created and the depth of the topmost window indicated by the old cover. If the new depth is less, then the new window becomes topmost. Otherwise, the old window is still the topmost window.

Destroying a window is similar to creating a window, except in the way the new cover is generated. When a window is created, the new bitmap is generated by setting the bit corresponding to the new window. When a window is destroyed, the corresponding bit in the bitmap is turned off. The way the "topmost" field is generated is also changed. When a window is created, the topmost window of a cover had to be either the previous topmost, or the new window. When destroying a window, the new topmost can become any window in the cover. If any other window than the one indicated as "topmost" is destroyed, then "topmost" is unchanged. If the "topmost" window is destroyed, then the bitmap must be scanned. The "topmost" is set to the window with the lowest depth of the windows indicated in the bitmap.

The procedure used to search for a new cover is a significant portion of the inner loop of the scanline modification procedure. The bitmap of the old cover must be modified, a hash key generated, and the new cover found in the hash table. This step can be avoided on many of the runs that will be examined during the process. The cost of generating a new cover can be avoided because most of the pixels of a window will share the same cover in practice. During the creation of a window, all the runs containing these pixels will be considered individually. In each case, since they have the same cover, the same new cover will be located by the procedure for finding a new cover. Thus, the work of searching for a new cover for each run can be avoided if a cache is maintained that records the association of the old cover and the new cover determined from a previous run. In the scanline modification procedure, this cache is checked and only call the subroute for finding a new cover is called only when the existing cover is not found in the cache. A hash table can be used for this cache. The input is the old cover index, and the contents are the new cover index. It is noted that this cache is valid only for a single window create or delete operation and needs to be reset before each subsequent operation.

WINDOW DISPLAY UPDATES

Figure 10A:
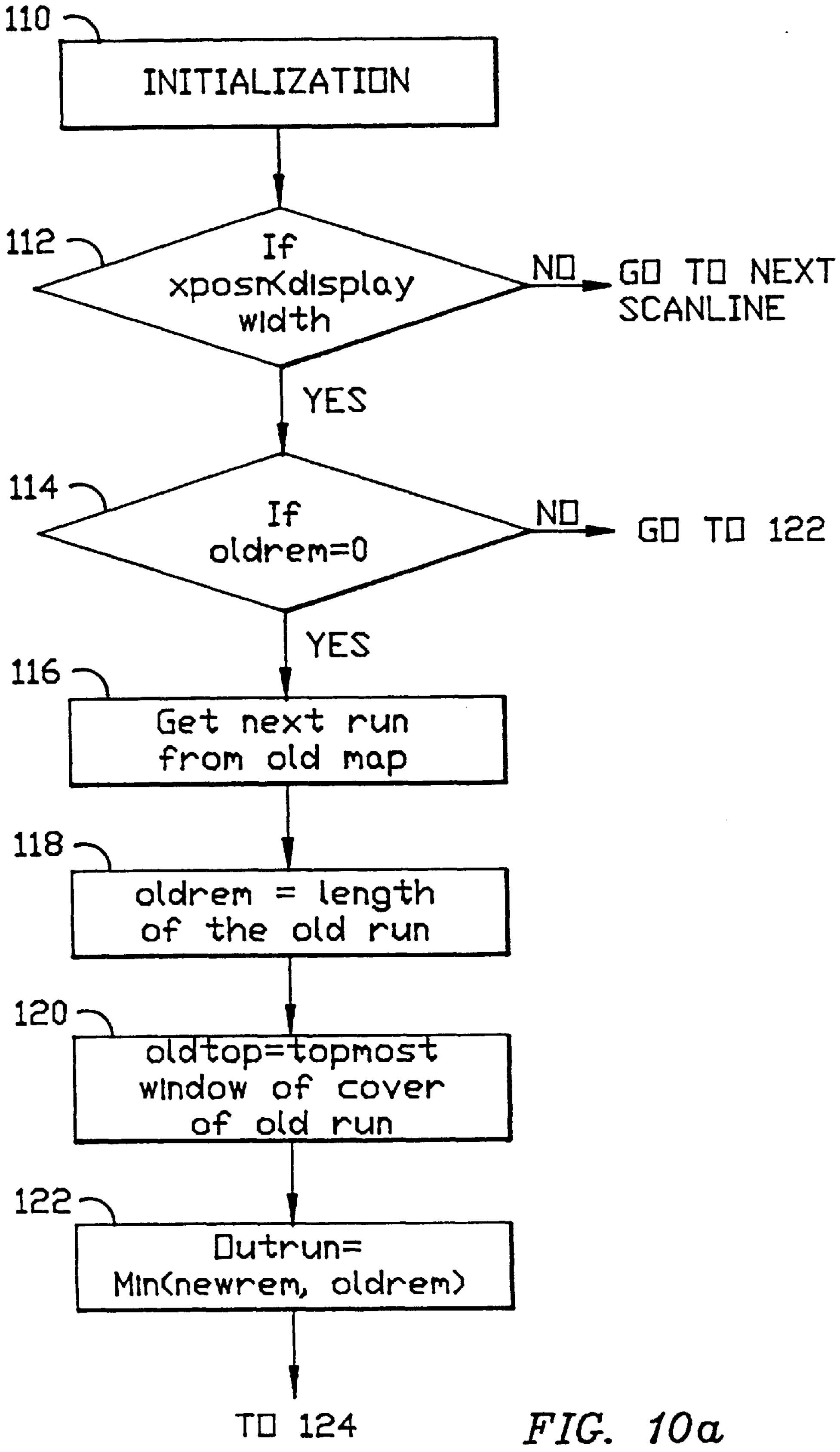
FIGS. 10*a*–10*b* set forth a flow diagram of a raster display update procedure implemented by the window management system of FIG. 3.
Figure 10B:
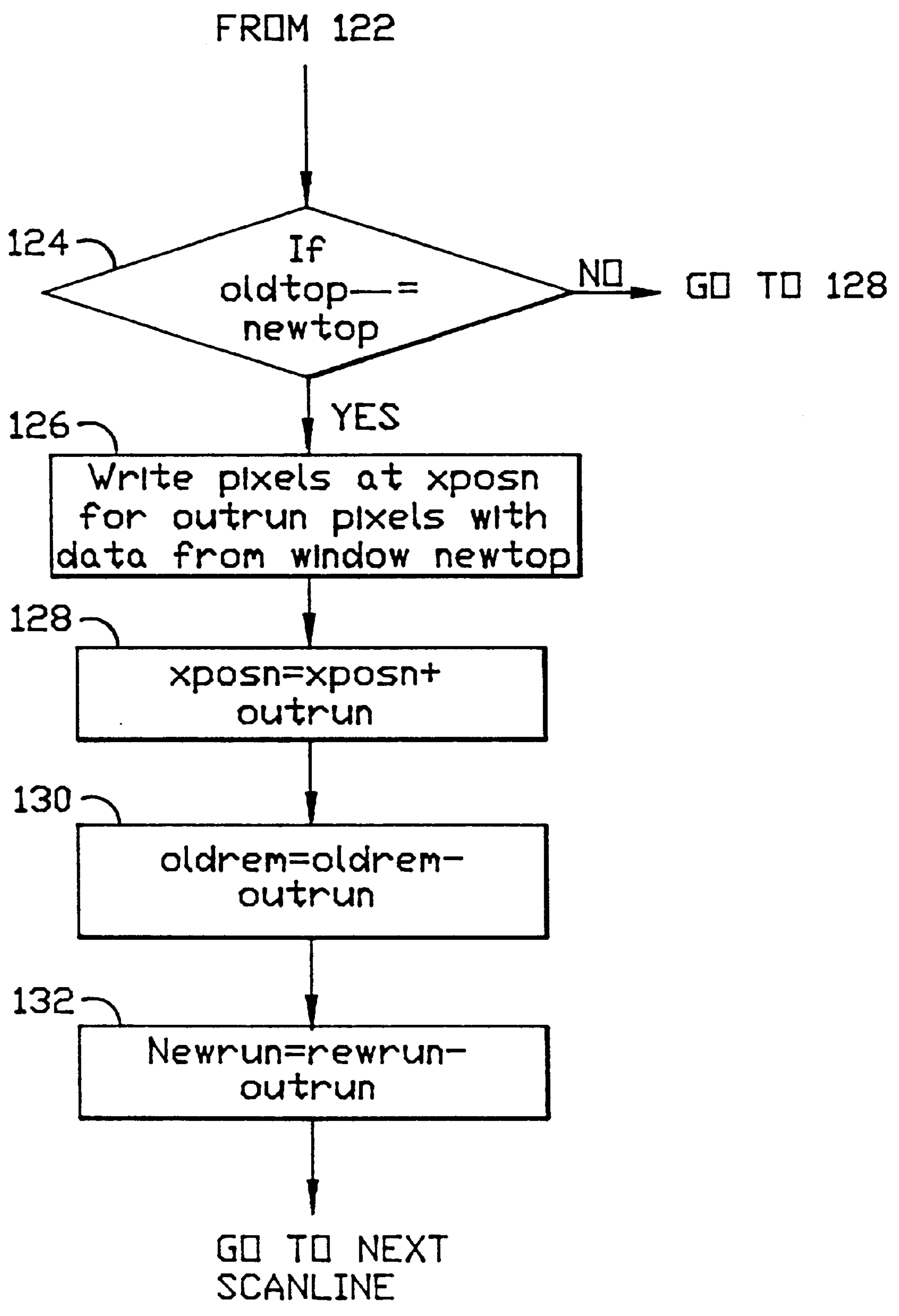

It will be appreciated that a new display map is generated for each window addition or window deletion performed in conjunction with a window operation. In some cases, several window operations may be performed between display updates. A series of new display maps will be generated. As each new display map is generated, the previously new generated display will serve as an old display map. When all window operations are completed, only the original old display map and the final new display map are used to repaint the raster display. The display is updated in a manner wherein only those picture elements having a new top window are updated. Pixels outside of the window region(s) generated by window operations are not updated. Moreover, pixels within the window region(s) having the same top window associated therewith are also not updated. In this manner, display updating is performed quickly and efficiently. The window updating procedure is graphically illustrated in the flow diagram of FIGS. 10*a* and 10*b*. The procedure is further set forth in pseudo code form in Appendix B. The procedure begins with an initialization step 110 wherein the following variables are initialized:

xposn=0–The current position of the scanline.

oldrem=0–The portion of the old scanline remaining to be processed.

newrem=0–The portion of the new scanline remaining to be processed.

For each scanline of the raster display within a window region(s), the procedure examines sequential picture element runs from left to right in the direction of increasing x-coordinate positions. In process step. 112, the pixel position "xposn" is tested to determine if the right-side of the display has been reached. If it has, the process returns to the initialization step 110 and the next scanline is evaluated. In process step 114, the variable "oldrem" is tested for equality with zero. If a false result is produced, the process jumps to step 122. If "oldrem" equals zero, process step 116 is performed and the next run is obtained from the old display map "oldmap". In process step 118, the variable "oldrem" is set equal to the length of the run and in process 120, the variable "oldtop" is set equal to the topmost window of the cover associated with the oldrun. The values determined in steps 118–120 are determined by consulting the old display map 38 and its display storage array 46. The storage array 46 identifies the run length and the cover index associated with the run. From the cover index, the topmost window is found from the cover collection 36. Process steps 114 through 120 are then repeated for the new display map to obtain the values of newrem and newtop. The foregoing process steps are set forth in pseudocode form, as follows:

```
while (xposn < display_width) begin
/*get the next run of the scanlines if necessary*/
if (oldrem = 0)
  then begin
    get the next run from oldmap
    oldrem = length of the run
    oldtop = topmost window of cover of run
  end
if (newrem = 0)
  then begin
    get the next run from newmap
    newrem = length of the run
    newtop = topmost window of cover or run
end
```

The display updating procedure next determines the intersection of picture elements contained in the old and new runs. From FIGS. 3 and 9, scanline 1, it is seen that the intersection of the first run of each map is the oldrun of FIG. 3 spanning display columns zero through two. This comparison is performed in process step 122 and is shown in pseudocode form, as follows:

```
/*figure intersection of scanlines*/
outrun = min(newrem, oldrem)
```

The display updating procedure next determines whether the topmost window has changed over the intersecting pixels determined in step 122. In process step 124, therefore, the variable "oldtop" is tested to determine it is different from the variable "newtop". If it is not, and the topmost window has not changed, the procedure jumps to step 128. In the case of FIGS. 3 and 9, the intersection of the first runs of scanline 1 produces a common cover of zero. Thus, these pixels are not refreshed and a second pass through the display update procedure is made. The next old map run of FIG. 3, scanline 1, spans display columns three through seven, The remaining portion of the first new map run of FIG. 9, scanline 1, spans display column three. The intersection with the old map run is a single pixel run spanning display column three. The covers of the old map and new map runs are different and topmost has changed. When the topmost window has changed, the procedure moves to step 126 and the intersecting pixels are written to the display beginning as xposn for "outrun" pixels, with data from the window "newtop". In the case of FIGS. 3 and 9, the intersecting run spanning display column three is written with data from window B. The procedure then moves to step 128 and the pixel position xposn is incremented by the number of intersecting pixels represented by "outrun". The variable "oldrem" representing the portion of the scanline remaining to be processed, is decremented by both outrun picture elements. In step 132, the variable "newrem" representing the portion of the new scanline remaining to be processed is also decremented by the value of "outrun". The process steps 124–132 are set forth in pseudo code form, as follows:

```
/*if topmost window has changed over these pixels*/
if (oldtop ¬ = newtop)
  then begin.
```

-continued

```
      write pixels at xposn, for outrun pixels, with
         data from window newtop.
   end
/*advance position in scanline*/
xposn = xposn + outrun
oldrem = oldrem − outrun
newrem = newrem − outrun
end
```

Following the display updating procedure, all of the scanlines in “oldmap” are freed and replaced with copies of the scanlines in “newmap”. Window descriptors marked as “destroyed” are also freed, and their index position is set to NULL. It should be noted that the actual update of the display with new window data can be done in several ways. If windows are kept as pixel arrays somewhere in memory, the update is a copy of some number of bytes from these arrays into the display. If windows are solid colors (i.e., if the algorithm is being used to manage graphics rather than windows), row of pixels with a single color are rewritten. If windows are updated by requesting a redraw from applications, then the updated fragment of the scanline is added to a clipping region, which will be used by the application when it performs its next update.

It will be further noted that the display updating routing redraws scanlines in order, from top to bottom. On many display systems, this update can be synchronized with display refresh, making changes to the display appear instantaneous.

Accordingly, a method for managing non-rectangular windows in a raster display has been disclosed. The invention allows management of non-rectangular windows, in a time period proportional primarily to the overlap of windows, rather than the total number of windows. Multiple changes to windows can be made and all display changes merged together so that no area of the screen is written twice. This improves upon the performance and user interface of conventional window update systems.

Although the invention has been shown and described with reference to a preferred embodiment, it will be understood that no limitation is intended thereby and that many modifications and adaptations will be apparent to persons skilled in the art. For example, scanlines have been described as being a made as single pixel high. In practice, windows tend to be rectangular, and there will be large rectangles with identical covers. Each scanline of a region, and each scanline in the display maps could be given a height. The basic nature of the window management system is not changed by doing this, but the procedure for updating the display maps is considerably more complicated. When a display scanline is compared with a region scanline having a different height, the display scanline must be split. To avoid fragmentation, consecutive display scanlines must be recombined if they are identical. Typically, this will happen after a window is destroyed. The invention, therefore, should not be limited except in accordance with the spirit of the following claims and their equivalents.

APPENDIX A

DISPLAY MAP MODIFICATION PROCEDURE

```
while (xposn < width) begin
   /* get the next run of region and oldscan,
   if necessary*/
   while (regionrem = 0) begin
      get the next run of the region.
      regionrem = length of the run
   end
   while (scanrem = 0) begin
      get the next run of oldscan
      scanrem = length of the run
      oldcover = cover of the run
   end
   /*find the intersection of the two runs*/
   newrun = min(regionrem, scanrem)
   if this run is within the region
      then begin
         newcover = generate a new cover (see below)
/*adjust the reference counts*/
oldcover−>refcount = oldcover−>refcount − newrun
if (oldcover−>refcount = 0)
   then put oldcover on the free cover list.
   newcover−>refcount = newcover−>refcount + newrun
end
/*if the new cover is different, we must create a new
   run in newscan*/
if (lastcover¬ = newcover)
   then begin
      add new run to newscan, count is newrun, cover is
      newcover
      lastcover = newcover
      lastrun = 0
end
/*add the run to the accumulated run*/
   lastrun = lastrun + newrun
/*subtract the run from the two sources*/
   scanrem = scanrem − newrun
   regionrem = regionrem − newrun
/*advance our position on the scanline*/
   xposn = xposn + newrun
end
/*output the last run*/
if (lastrun ¬ = 0)
   then add last run to newscan, count is lastrun, cover
   is last cover.
```

APPENDIX B

DISPLAY UPDATE PROCEDURE

```
while (xposn < display_width) begin
/*get the next run of the scanlines if necessary*/
if (oldrem = 0)
   then begin
      get the next run from oldmap
      oldrem = length of the run
      oldtop = topmost window of cover of run
   end
if (newrem = 0)
   then begin
      get the next run from newmap
      newrem = length of the run
      newtop = topmost window of cover or run
   end
/*figure intersection of scanlines*/
outrun = min(newrem, oldrem)
/*if topmost window has changed over these pixels*/
if (oldtop ¬ = newtop)
   then begin
      write pixels at xposn, for outrun pixels, with
         data from window newtop.
   end
/*advance position in scanline*/
xposn = xposn + outrun
oldrem = oldrem − outrun
newrem = newrem − outrun
end
```

I claim:

1. A computer-implemented method for managing windows in a raster display, comprising the steps of:

generating a first display map of values identifying sequential picture element runs of the raster display having a common set of windows containing the picture elements of the run, an associated window stacking order, and a topmost window to be drawn in the raster display;

in response to a window operation in the display, generating a second display map of values identifying sequential picture element runs of the raster display, each run having a common set of windows containing the picture elements of the run, an associated window stacking order, and a topmost window to be drawn in the raster display;

comparing said first display map with said second display map to identify picture elements whose topmost window has changed; and repainting the raster display by writing said changed picture elements with data from the topmost window of the identified picture elements.

2. The method of claim 1 wherein the steps of generating said first display map and said second display map include assigning, to each picture element run, a window cover specifying an associated window group and topmost window, and wherein the step of comparing said first display map with said second display map includes comparing the window covers of said picture element runs.

3. The method of claim 1 wherein the step of generating said second display map includes modifying said first display map by identifying a region of the raster display wherein a window operation has occurred, and identifying new picture element runs that reflect changes in window stacking order in said region.

4. The method of claim 3 wherein the step of generating said second display map further includes copying values of said first display map corresponding to picture element runs lying outside of said region.

5. The method of claim 3 wherein the step of generating said second display map further includes generating display map values representing a combining of new picture element runs with adjacent picture element runs having the same window stacking order.

6. The method of claim 1 wherein the step of generating said second display map includes:

identifying a raster display region wherein window repositioning has occurred;

copying portions of first display map values corresponding to picture element runs which lie completely outside of said window region to said second display map;

for each picture element run extending in said window region, identifying a run portion thereof lying within said window region;

creating from said identified run portion a first display map value identifying said run portion as a new picture element run;

determining a new window stacking order for said new picture element run;

comparing said new window stacking order with the window stacking order of an adjacent picture element run whose value has been created for said second display map; and upon a match, generating a second value representing a combining of said new picture element run with said adjacent picture element run and adding said value to said second display map and, upon a mismatch, adding said first value to said second display map.

7. The method of claim 6 wherein the step of determining a new window stacking order for a new picture element run of said second display map includes modifying the stacking order of a corresponding picture element run of said first display map to reflect addition or deletion of a window in said region.

8. The method of claim 1 wherein the step of generating said first display map includes:

generating an array of window descriptors, each window descriptor corresponding to a window in the raster display and specifying a position of the window in a window stacking order;

generating a collection of window covers, each window cover having a cover index, a map defining a combination of windows from said array of window descriptors and an indicator specifying the topmost window of each combination; and assigning a window cover index to each picture element run.

9. The method of claim 8 wherein the step of generating said second display map includes changing the cover index of portions of the first display map picture element runs to identify new picture element runs reflecting changes in window positioning, said new picture element runs being identified by modifying the window cover map of the first display map picture element runs, searching the collection of window covers for a cover having a corresponding map and, if a match is determined, assigning the matching cover to the new picture element runs, and if a match is not determined, generating a new window cover.

10. The method of claim 9 wherein the step of generating a new window cover includes generating a new topmost window identifier.

11. In a data processing device including a CPU, an input system including a keyboard, an output system including a raster display device, a data storage resource, and appropriate programming for defining one or more display windows in the raster display device, a system for managing the raster display windows, comprising:

means for generating a first display map defining sequential picture element runs, each run having common set of windows-containing the picture elements of the run, said windows being arranged in a stacking order and including a topmost window to be drawn in the raster display;

means for generating a second display map defining sequential picture element runs in response to a change in the positioning of windows in the display, each run having a common set of windows containing the picture elements of the run, said windows being arranged in a stacking order, and including a topmost window to be drawn in the raster display;

means for comparing said first display map with said second display map to identify picture elements whose topmost window has changed; and means for repainting the raster display by writing said changed picture elements with data from the topmost window of the identified picture elements.

12. The system of claim 11 wherein said means for generating said first display map and said second display map includes means for assigning to each picture element run, a window cover specifying an associated window group and topmost window, and wherein said means for comparing said first display map with said second display map includes means for comparing the window covers of said picture element runs.

13. The system of claim 11 wherein said means for generating said second display map includes means for modifying said first display map by identifying a region of the raster display wherein window repositioning has occurred, and defining new picture element runs that reflect changes in window stacking order in said region.

14. The system of claim 13 wherein said means for generating said second display map further includes means for defining portions of picture element runs of said first display map lying outside of said region.

15. The system of claim 13 wherein said means for generating said second display map further includes means for defining new picture element runs which are combined with adjacent picture element runs having the same window stacking order.

16. The system of claim 11 wherein said means for generating said second display map includes:

means for identifying a raster display region wherein window repositioning has occurred;

means for defining in said second display map portions of picture element runs of said first display map which lie completely outside of said window region;

means for identifying, for each first display map picture element run extending in said window region, a run portion thereof lying within said window region;

means for defining in said second display map, from said identified run portion a new picture element run;

means for determining a new window stacking order for said new picture element run;

means for comparing said new window stacking order with the window stacking order of an adjacent previously defined picture element run; and means for combining, upon a match, said new picture element run with said previously defined picture element run and means for adding, upon a mismatch, said new picture element run to said second display map as a new defined picture element run.

17. The system of claim 16 wherein said means for determining a new window stacking order for a new picture element run includes means for modifying the stacking order of a corresponding picture element run defined in said first display map to reflect addition or deletion of a window in said region.

18. The system of claim 11 wherein said means for generating said first display map includes:

means for generating an array of window descriptors, each window descriptor corresponding to a window in the raster display and specifying a position of the window in a window stacking order;

means for generating a collection of window covers, each window cover having a cover index, a map defining a combination of windows from said array of window descriptors and an indicator specifying the topmost window of each combination; and means for assigning a window cover index to each picture element run.

19. The system of claim 18 wherein said means for generating said second display map includes means for changing the cover index of portions of the first display map picture element runs to create new picture element runs reflecting changes in window positioning, and wherein said means for creating new picture element runs includes means for modifying the window cover map of the first display map picture element runs, searching the collection of window covers for a cover having a corresponding map and, if a match is determined, assigning the matching cover to the new picture element runs, and if a match is not determined, generating a new window cover.

20. The system of claim 19 wherein said means for generating a new window cover includes means for generating a new topmost window identifier.

* * * * *